(12) United States Patent
Moore et al.

(10) Patent No.: US 7,562,370 B2
(45) Date of Patent: Jul. 14, 2009

(54) STATELESS SESSION ENTERPRISE JAVA BEAN INITIALIZATION METHOD

(75) Inventors: Victor S. Moore, Boynton Beach, FL (US); Wendi L. Nusbickel, Boca Raton, FL (US); Ricardo Dos Santos, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/833,563

(22) Filed: Apr. 28, 2004

(65) Prior Publication Data

US 2005/0246678 A1 Nov. 3, 2005

(51) Int. Cl.
G06F 3/00 (2006.01)
G06F 9/44 (2006.01)
G06F 9/46 (2006.01)
G06F 13/00 (2006.01)

(52) U.S. Cl. ..................................................... 719/330
(58) Field of Classification Search .................. 719/330
See application file for complete search history.

(56) References Cited

U.S. PATENT DOCUMENTS

| 6,085,120 | A | 7/2000 | Schwerdtfeger et al. | |
|---|---|---|---|---|
| 6,275,916 | B1 * | 8/2001 | Weldon et al. | 711/170 |
| 6,396,515 | B1 | 5/2002 | Hetherington et al. | |
| 6,567,809 | B2 | 5/2003 | Santosuosso | |
| 6,567,852 | B2 | 5/2003 | Besaw et al. | |
| 7,086,065 | B1 * | 8/2006 | Yeluripati et al. | 719/311 |
| 7,472,399 | B2 * | 12/2008 | Conway | 719/330 |
| 2002/0194388 | A1 * | 12/2002 | Boloker et al. | 709/310 |

OTHER PUBLICATIONS

Ahmed, Z., Umrysh, C.E., "Developing Enterprise Java Applications with J2EE and UML", 2001, Addison Wesley Professional, pp. Chapter 12.*
Richard Monson-Haefel, "J2EE Web Services", Oct. 2003, Addison Wesley Professional, pp. chapter 11.*
Richard Monson-Haefel, "Enterprise JavaBean", 1999, O'Reilly & Associates, Inc, First Edition, pp. 5, 9, 47-53, 161-162, 170-172.*
Damov, Stoyan, "ObjectPool—a library for pooling .NET objects", Oct. 2002, Code Project, pp. 1-16.*

* cited by examiner

*Primary Examiner*—Meng-Ai An
*Assistant Examiner*—KimbleAnn Verdi
(74) *Attorney, Agent, or Firm*—Novak Druce + Quigg LLP

(57) ABSTRACT

A method for initializing stateless session EJBs that includes the steps of identifying a quantity of EJB to initialize, invoking a stateless session EJB, and occupying the invoked stateless session EJB so that the stateless session EJB is not released into a pool of available EJBs. The invoking and occupying steps can be repeated for number of iterations equal to the identified quantity. Each instance of the occupying step can be completed after the last iteration of the invoking step occurs.

5 Claims, 3 Drawing Sheets

```
public class EJBInitServlet extends HttpServlet{
    ...
    public void init() throws ServletException{
        ...
        //Get parms from initialization, including number of EJBs to initialize
        int numEJBs = 5;
        final String snumEJBs = getInitParamater("numejbs");
        if(snumEJBs != null) numEJBs = Integer.parseInt(snumEJBs);
        ...
        // Get access to the EJB home(s)
        final InitialContext initCtx = new InitialContext();
        final Object homeObject = initCtx.lookup(MyEJB.JNDI_NAME);
        final MyEJBHome home = (MyEJBHome)javax.rmi.PortableRemoteObject.narrow(homeObject, MyEJBHome.class);

// Initialize/pre-load a set of EJBs
        for(int i=0; i < numEJBs; i++){
            final MyEJB EJB = home.create(); //cause an ejbCreate
            new Thread (){
                public void run(){
                    try {
                    // touch the EJBs with a harmless method, so they are created
                    ejb.initialize(numEJBs); // block for 'num' seconds
                    } catch (Exception e){}
                }
            }.start();
            ...
        }
    }
}
```

FIG. 3

STATELESS SESSION ENTERPRISE JAVA BEAN INITIALIZATION METHOD

BACKGROUND

1. Field of the Invention

The present invention relates to the field of computer software and, more particularly, to stateless session Enterprise Java Beans.

2. Description of the Related Art

Enterprise Java Beans (EJB) are reusable and portable software components that model business objects and processes. EJBs can run on any EJB enterprise server compliant with the Java 2 Enterprise Edition (J2EE) specification. The EJB server can manage many significant overhead issues such as object persistence, security, and transaction management. There are multiple types of EJBs including entity beans, session beans, and message driven beans.

A session EJB is a reusable component that maintains conversations or sessions with clients. Two types of session EJBs are stateful and stateless EJBs. A stateful session EJB maintains a conversational state with one client for the duration of a single session. This implies that the stateful session EJB can maintain instance variables across multiple invocations from the same client during a single session. Once the client finishes interacting with the stateful session EJB, the session for the EJB ends and all state data for the stateful EJB is discarded.

A stateless session bean does not maintain a conversational state for each individual client. When a client requests a stateless session bean, the client receives an existing instance from a pool of previously created stateless session beans. If no previously created EJBs exist in the pool, a new instance is created. A stateless session bean is removed from the pool for the duration of any method call from a client. After the method completes, the stateless session bean is returned to the pool. Each invocation of a stateless session EJB should be considered as a request to a brand new object instance, since any instance-variable state will be lost between invocations. The transient nature of stateless session EJBs allows an EJB container to reuse EJB instances, which may optimize performance in many situations.

The creation of a stateless session EJB can require startup overhead such as allocating sufficient memory for the EJB and initializing reference variables for the EJB. The first client to request access to a stateless session EJB can experience a performance lag when no pre-existing EJB is available for use due to the overhead in creating a new EJB instance. This overhead can cause a delay in program execution. The resulting delay can be unacceptable in many situations, including situations where real-time and/or near real-time responses are necessary.

Conventional programming practices do not provide a technique for initializing a multitude of stateless session EJBs. The problem with initializing stateless session EJBs is that if there is an existing instance of the EJB that is "free," subsequent creation attempts will use the free instance of the EJB instead of creating a new instance of the EJB and adding the new instance to the pool of "free" EJBs. That is, EJBs are created on the first real method invocation of an object and simply calling a create: method does not ensure the creation of a new EJB instance.

SUMMARY OF THE INVENTION

The present invention provides a method, a system, and an apparatus for initializing a pool of stateless session Enterprise Java Beans (EJBs). According to the subject matter disclosed herein, a Web-based application server can initialize a configurable quantity of stateless session EJBs at startup. A blocking method utilized while initializing the predetermined quantity of EJBs ensures that repetitive EJB create calls return new instances of EJBs instead of utilizing previously created EJBs from a pool of "free" EJBs. The pool of instantiated EJBs can prevent clients from experiencing a performance lag the first time a request for a stateless session EJB is made.

One aspect of the present invention can include a method for initializing stateless session EJBs that includes the steps of identifying a quantity of EJB to initialize, invoking a stateless session EJB, and occupying the invoked stateless session EJB so that the stateless session EJB is not released into a pool of available EJBs. The invoking and occupying steps can be repeated for number of iterations equal to the identified quantity. Each instance of the occupying step can be completed after the last iteration of the invoking step occurs.

Moreover, this invention can be implemented as a program for controlling a computer to implement the functions described above, or a program for enabling a computer to perform the process corresponding to each step of the method presented above. This program may be provided by storing the program in a machine-readable storage such as a magnetic disk, an optical disk, a semiconductor memory, any other recording medium, or distributed via a network.

BRIEF DESCRIPTION OF THE DRAWINGS

There are shown in the drawings, embodiments that are presently preferred it being understood, however, that the invention is not limited to the precise arrangements and instrumentalities shown.

FIG. 3 is expository pseudo-code for pre-loading stateless session EJBs in accordance with the inventive arrangements disclosed herein.

DETAILED DESCRIPTION OF THE INVENTION

The present invention discloses a technique for pre-loading a multitude of stateless session EJBs into an EJB container, thereby establishing a "free" pool of available stateless session EJBs. The preloading technique alleviates the problem of suffering a performance lag when EJB clients initially request stateless session EJBs. The performance lag normally results from initial set-up costs for instantiating EJBs. In embodiments where real time and near-real time responses are expected, the typical performance lag that is mitigated by preloading technique presented herein can be highly problematic.

Figure 1:
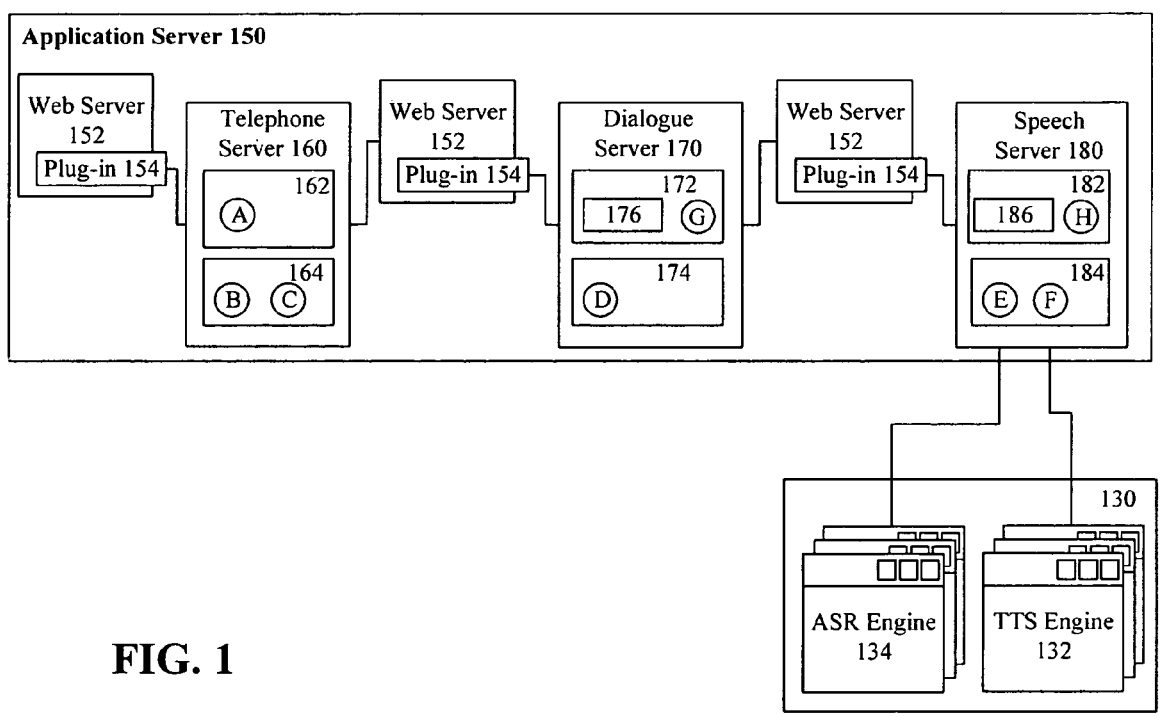
FIG. 1 is a schematic diagram illustrating a system including a Web-based application server that initializes stateless session Enterprise Java Beans (EJBs) in accordance with the inventive arrangements disclosed herein.

FIG. 1 is a schematic diagram illustrating a system 100 including a Web-based application server that initializes stateless session Enterprise Java Beans (EJBs) in accordance with the inventive arrangements disclosed herein. More specifically, in system 100, a multitude of stateless session EJBs, including Bean B, Bean C, Bean D, Bean E, and Bean F can be instantiated within virtual machines of the application server 150 when the application server 150 starts. Servlets, such as servlet A, can be included in each of the virtual machines to execute the preloading routines.

In one arrangement, the application server 150 can include a multitude of component servers, such as telephone server 160, dialogue server 170, and speech server 180, communicatively linked via a multitude of Web servers 152. Each Web server 152 can include one or more plug-ins 154, where each plug-in 154 can include routines for conveying data to particular component servers within the application server 150. In a particular arrangement, component servers of the application server 150 can also be distributed across a network. In such an arrangement, data can be conveyed to each of the component servers via the Web servers 152. The Web servers 152 can utilize Hypertext Protocol Format (HTTP) for compatibility with IP sprayers and firewalls.

The telephone server 160, the dialogue server 170, and the speech server 180 can be implemented as virtual machines, such as virtual machines complying with the J2EE specification. The telephone server 160 can control the setup, monitoring, and tear down of phone calls. In one arrangement, telephone server 160 can include a web container 162 and an EJB container 164. Moreover, the telephone server 160 can include a call control servlet (servlet A), a call control EJB (Bean B), and a call control interpreter EJB (Bean C).

The dialogue server 170 can manage tasks relating to call dialogue for the application server 150. In one arrangement, the dialogue server 170 can include web container 172, EJB container 174, and memory cache 176. Moreover, the dialogue server 170 can include a voice markup interpreter EJB (Bean D). Bean D can be a stateless session EJB that is initialized when the application server 150 starts in accordance with the inventive arrangements disclosed herein.

The speech server 180 can handle one or more speech services for the application server 150. In one arrangement, the speech server 180 can include web container 182, EJB container 184, and memory cache 186. Moreover, the speech server 180 can include speech engine interface beans. Each of the speech engine interface beans can be used to interface with a particular speech engine 130. For example, Bean B can be an automatic speech recognition (ASR) interface bean that interfaces with a ASR Engine 134. Bean F can be a text-to-speech interface bean that interfaces with a TTS engine 132. Further, Bean E and Bean F can be stateless session EJBs that are initialized when the application server 150 starts in accordance with the inventive arrangements disclosed herein.

It should be appreciated that the application server 150 can be arranged in a multitude of fashions and that the invention is not to be limited to the illustrative arrangement presented herein. Further, the application server 150 can include any number of virtual machines, selective ones of which can be preloaded with stateless session EJBs. Different numbers of stateless session EJBs can be preloaded into different. EJB containers of different virtual machines of the application server 150 as appropriate for performing operational tasks of the application server 150.

Figure 2:
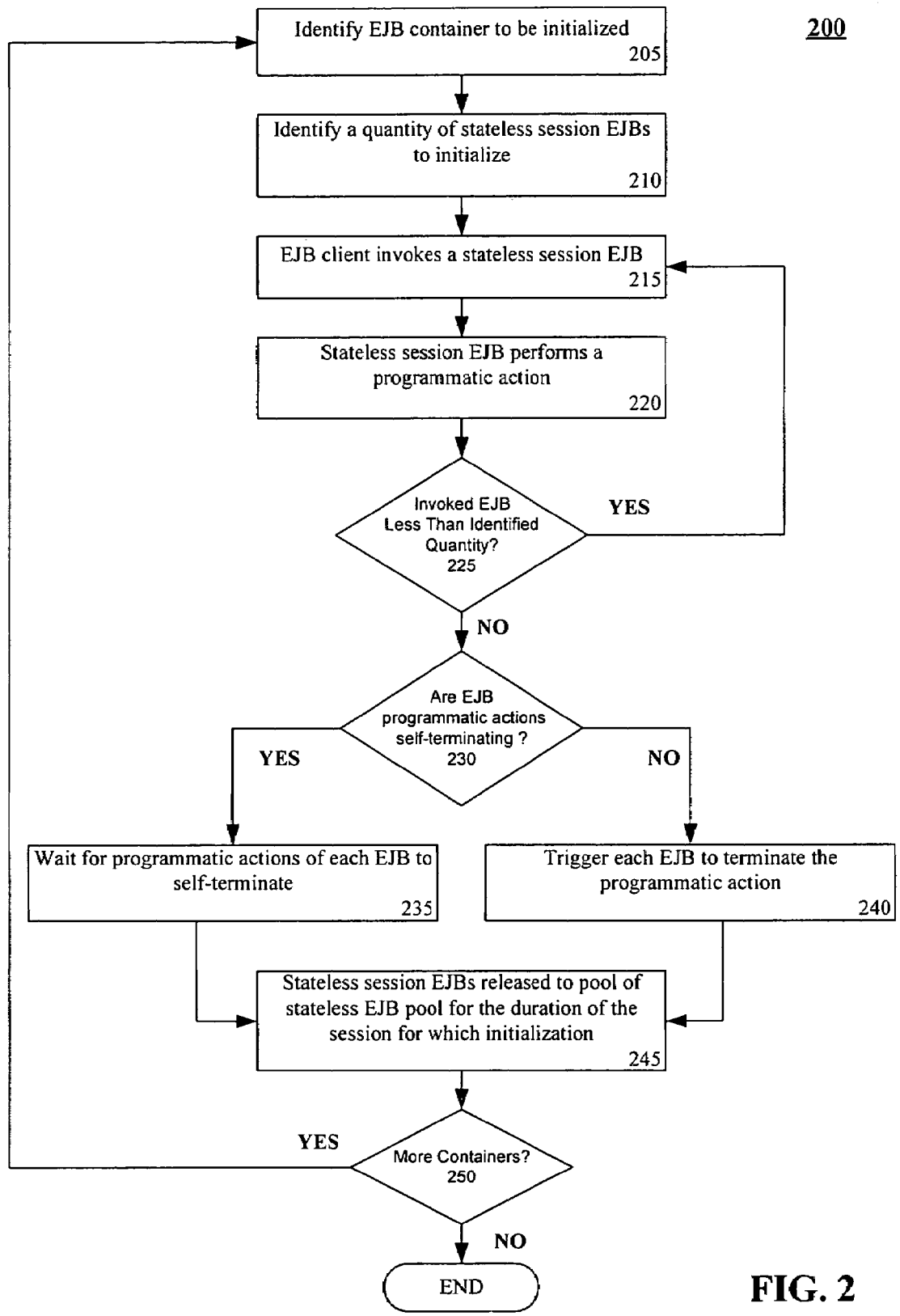
FIG. 2 is a flow chart illustrating a method for initializing stateless session EJBs in accordance with the inventive arrangements disclosed herein.

FIG. 2 is a flow chart illustrating a method 200 for initializing stateless session EJBs in accordance with the inventive arrangements disclosed herein. The method 200 can be performed in the context of any software system having at least one virtual machine in which the stateless session EJBs are to be pre-loaded. For example, the method 200 can be performed within the virtual machines of a Web-enabled application server, such as a WAS. The method 200 can begin in step 205, where an EJB container for which stateless session EJBs are to be preloaded can be identified. In step 210, a quantity of stateless session EJBs that are to be instantiated with the EJB container can be determined. In step 215, an EJB client for the EJB container can then invoke a new stateless session EJB.

In step 220, the new stateless session EJB can perform a programmatic action. It should be noted that as long as the EJB performs the action, the EJB is occupied and will not be released to a pool of stateless session EJBs. The EJB is to remain occupied until the desired quantity of EJBs have been instantiated or initialized for the EJB container. In step 225, when the number of invoked EJB is less than the identified quantity of needed EJBs, the method can loop back to step 215, where another new stateless session EJB can be invoked. When the number of invoked EJB is greater than or equal to the identified quantity, the method can proceed to step 230.

In step 230, a determination can be made as to whether the programmatic actions that the EJBs are executing are self-terminating programmatic actions. One example of a self-terminating programmatic action can be a timed delay routine that executes for a predetermined time period. In one embodiment, such a delay can be, induced by repeating an iterative loop a designated number of times. When the EJB actions are self terminating, the method can proceed to step 235, where the method can wait for each of the programmatic actions to terminate before proceeding.

When the programmatic actions are not self terminating, the method can proceed to step 240, a terminate action can be triggered for each EJB. In step 245, once each stateless session EJB has finished executing the programmatic action and is therefore no longer occupied, the EJBs can be released into a pool of available EJBs. In step 250, when there are more EJB containers to initialize, the method can loop to step 205, where the next EJB container can be identified. Otherwise the method can finish, as the requisite number of stateless session EJBs have been initialized for the session.

FIG. 3 is expository pseudo-code for pre-loading stateless session EJBs in accordance with the inventive arrangements disclosed herein. It should be appreciated that the above coding example provides just one illustrative method of initializing stateless session EJBs and that the preloading technique of the present invention can be implemented in any of a multitude of fashions using known software programming techniques. Accordingly, the invention should be interpreted to encompass all coding derivations that utilize the technique described herein.

In one embodiment, a servlet can be created to initialize EJBs when a targeted application starts. A, configurable parameter within the servlet can determine the number of stateless session EJBs that are created when the servlet is run. Each time a stateless session EJB is created by the servlet, a method is executed to keep the EJB temporarily occupied. The method therefore is a blocking method that executes for an arbitrary duration so that a created EJB is not placed into the reuse pool until the requisite number of EJBs have been created. The arbitrary duration should be long enough that the last EJB can be created before the first blocking method expires. After the desired quantity of stateless session EJBs have been created, the blocking methods can expire and/or be removed, thereby placing each stateless session EJB into the pool.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for initializing a configurable quantity of stateless session Enterprise Java Beans (EJBs) comprising the steps of:
    predetermining a quantity of stateless session EJBs to be created;
    creating a stateless session EJB;
    occupying the created stateless session EJB so that said stateless session EJB is not released into a pool of available stateless session EJBs, said stateless session EJB executing a blocking method with an execution completion time that is greater than a time required to create the predetermined quantity of stateless session EJBs;
    repeating said creating a stateless session EJB and occupying the created stateless session EJB until said predetermined quantity of stateless session EJBs have been created; and
    releasing the created predetermined quantity of stateless session EJBs into the pool of available stateless session EJBs after said predetermined quantity of stateless session EJBs have been created; and
    establishing a servlet as an EJB client, said servlet performing said predetermining a quantity of stateless session EJBs to be created, creating a stateless session EJB, occupying the created stateless session EJB, and repeating said creating a stateless session EJB and occupying the created stateless session EJB until said predetermined quantity of stateless session EJBs have been created.

2. The method of claim 1, further comprising the step of:
    completing each instance of said occupying the created stateless session EJB after a last iteration of said creating a stateless session EJB occurs.

3. The method of claim 1, wherein the method is performed during an initialization of a Web-based application server.

4. A computer-implemented method for initializing a configurable quantity of stateless session Enterprise Java Beans (EJBs) comprising the steps of:
    predetermining a quantity of stateless session EJBs to be created;
    creating a stateless session EJB;
    occupying the created stateless session EJB so that said stateless session EJB is not released into a pool of available stateless session EJBs, said stateless session EJB executing a blocking method with an execution completion time that is greater than a time required to create the predetermined quantity of stateless session EJBs;
    repeating said creating a stateless session EJB and occupying the created stateless session EJB until said predetermined quantity of stateless session EJBs have been created; and
    releasing the created predetermined quantity of stateless session EJBs into the pool of available stateless session EJBs after said predetermined quantity of stateless session EJBs have been created;
    wherein the method is performed during an initialization of a Web-based application server; and
    wherein said Web-based application server is a Websphere-type application server, said Websphere-type application server comprising a voice server that is a virtual machine, wherein said stateless session EJBs are initialized within an EJB container of said voice server.

5. A computer-implemented method for initializing a configurable quantity of stateless session Enterprise Java Beans (EJBs) comprising the steps of:
    predetermining a quantity of stateless session EJBs to be created;
    creating a stateless session EJB;
    occupying the created stateless session EJB so that said stateless session EJB is not released into a pool of available stateless session EJBs, said stateless session EJB executing a blocking method with an execution completion time that is greater than a time required to create the predetermined quantity of stateless session EJBs;
    repeating said creating a stateless session EJB and occupying the created stateless session EJB until said predetermined quantity of stateless session EJBs have been created;
    releasing the created predetermined quantity of stateless session EJBs into the pool of available stateless session EJBs after said predetermined quantity of stateless session EJBs have been created;
    wherein the method is performed during an initialization of a Web-based application server; and
    wherein said Web-based application server contains at least two virtual machines, each virtual machine implementing said predetermining a quantity of stateless session EJBs to be created, creating a stateless session EJB, occupying the created stateless session EJB, and repeating said creating a stateless session EJB and occupying the created stateless session EJB until said predetermined quantity of EJBs have been created.

* * * * *